United States Patent [19]

Hanning

[11] 4,115,491
[45] Sep. 19, 1978

[54] METHOD OF MAKING THERMOPLASTIC ARTICLES WITH POROUS CORES

[76] Inventor: Robert Hanning, Via Tagliaferri 15, Campione d'Italia, Italy

[21] Appl. No.: 687,339

[22] Filed: May 17, 1976

Related U.S. Application Data

[62] Division of Ser. No. 599,055, Jul. 25, 1975, Pat. No. 4,033,710.

[51] Int. Cl.² ............................................. B29D 27/00
[52] U.S. Cl. .................................. 264/45.1; 264/97; 264/DIG. 1; 264/DIG. 5; 264/DIG. 83
[58] Field of Search ............... 264/45.5, 46.1, 45.9, 264/DIG. 1, DIG. 14, DIG. 83, 45.1, 97, DIG. 5

[56] References Cited

U.S. PATENT DOCUMENTS

| 3,558,751 | 1/1971 | Santelli | 264/45.5 |
|---|---|---|---|
| 3,894,823 | 7/1975 | Hanning | 264/DIG. 83 |
| 3,901,958 | 8/1975 | Doll | 264/DIG. 1 |
| 3,956,438 | 5/1976 | Schippers | 264/46.1 |
| 3,972,970 | 8/1976 | Taylor | 264/53 X |

FOREIGN PATENT DOCUMENTS

| 852,609 | 10/1952 | Fed. Rep. of Germany | 425/DIG. 206 |
|---|---|---|---|
| 1,929,343 | 12/1970 | Fed. Rep. of Germany | 264/45.1 |
| 1,168,933 | 10/1969 | United Kingdom | 264/45.5 |

*Primary Examiner*—Philip Anderson
*Attorney, Agent, or Firm*—Karl F. Ross

[57] ABSTRACT

Thermoplastic articles with highly porous cores and less porous or nonporous skins are injection-molded with the aid of a nozzle having a flow divider disposed upstream of its aprue for splitting the oncoming plastic mass into a homogeneous outer stream and an inner stream admixed with a foaming agent, the two streams merging inside the gate of a mold cavity. The foaming agent enters through a central channel which may be provided with one or more ducts alternately usable to introduce pressure fluid and coolant into the cavity lined with coalescing layers of nonfoamed and foamed plastic. The flow divider may be axially movable within the nozzle to serve as a control valve and flow regulator.

3 Claims, 3 Drawing Figures

METHOD OF MAKING THERMOPLASTIC ARTICLES WITH POROUS CORES

CROSS-REFERENCE TO RELATED APPLICATION

This is a division of my application Ser. No. 599,05 filed July 25, 1975, now U.S. Pat. No. 4,033,710.

FIELD OF THE INVENTION

My present invention relates to a method of making integral thermoplastic articles consisting in part of highly porous foam material and in part of material having low to zero porosity. More particularly, the invention relates to the injection-molding of such thermoplastic articles with a porous core and a substantially nonporous outer skin.

BACKGROUND OF THE INVENTION

The molding of highly porous bodies from thermoplastic materials admixed with an expanding fluid or foaming agent, such as a Freon, is well known. The outer surface of such a body may be somewhat less porous than its interior, owing to the pressure to which the injected plastic mass is subjected at the wall of the mold cavity. Even the presence of these finer pores, however, is objectionable in many instances in which the finished article (e.g. an elastic ball) is to be smooth in appearance and/or to the touch. A requirement for absolute impermeability exists in certain cases as, for example, where the molded body is to serve as a receptacle for a fluid to be stored.

Heretofore, articles of this type divided into highly porous and more or less nonporous parts were molded in separate steps, the foamable and the nonfoamable material being successively introduced into the mold cavity from different injection chambers in which these components were subjected to the necessary heat and pressure; see my prior U.S. Pat. No. 3,894,823 and copending application Ser. No. 521,184, now U.S. Pat. No. 4,014,966, filed Nov. 5, 1974 as a continuation of application Ser. No. 286,733 filed Sept. 6, 1972 and now abandoned. Aside from the fact that the provision of such dual injectors is somewhat cumbersome, it has also been found that the layers formed from these separately prepared and injected materials do not always bond firmly to one another even if injection of the foamable material takes place while the previously injected nonfoaming material is still in a semifluid state. This poor adhesion between the adjoining layers is apparently due to the dissimilar histories of their materials.

OBJECTS OF THE INVENTION

The object of my present invention, therefore, is to provide an improved method of producing partly porous thermoplastic articles of this description in such a way as to obtain an integral structure in which the porous and more or less nonporous parts are firmly and uniformly bonded to one another.

SUMMARY OF THE INVENTION

I have found, in accordance with my present invention, that the aforestated drawbacks can be avoided by splitting the flow of thermoplastic material, entering a mold cavity through an injection nozzle, inside that nozzle into a first and a second stream merging with each other at the entrance of the mold cavity, the first stream being left substantially homogeneous while a foaming agent is admixed with the second stream in the nozzle. Contiguous layers of thermoplastic material, formed within the mold cavity from these two streams, integrate themselves into a unitary structure upon hardening.

Thus, a nozzle of an injection-molding machine adapted to carry out the method according to my invention includes a flow divider forming a first and a second flow path between an entrance port and a sprue, the foaming agent being introduced only into the second flow path via inlet means forming a passage which is open to the latter but separated from the first flow path.

Particularly good adhesion between the contiguous layers is achieved, in accordance with another feature of my invention, by subjecting the freshly injected material to a blow-molding step, i.e. by introducing a pressure fluid into the mold cavity together with the second stream of thermoplastic material for inflating the porous core, formed by that stream, into a hollow body. For this purpose I prefer to provide the nozzle with a ring space defining with the flow divider, designed as an annular member, an outer clearance forming part of the first flow path and an inner clearance forming part of the second flow path, the inlet passage for the foaming agent forming a generally axial channel which accommodates a duct connectable to a source of pressure fluid. The duct, advantageously, is a tube which can be axially moved into and out of the gate of the mold cavity communicating with the sprue of the nozzle. Such a duct, preferably the same tube, can also be used for the admission of a coolant into the cavity designed to expedite the hardening of the thermoplastic material therein.

Advantageously, the annular flow divider is axially movable in the nozzle and has surfaces coacting with the walls of the ring space for adjustably obstructing the flow of thermoplastic material through the inner and outer clearances. Under the control of an externally operable actuator, such as a manual knob or an automatic transmission, the flow divider may shut off the entry of thermoplastic material into the mold cavity (e.g. during the extraction of a previously molded article therefrom) and may also serve to vary the flow ratio in the two clearances.

BRIEF DESCRIPTION OF THE DRAWING

The above and other features of my invention will now be described in detail with reference to the accompanying drawing in which.

SPECIFIC DESCRIPTION

Figure 1:
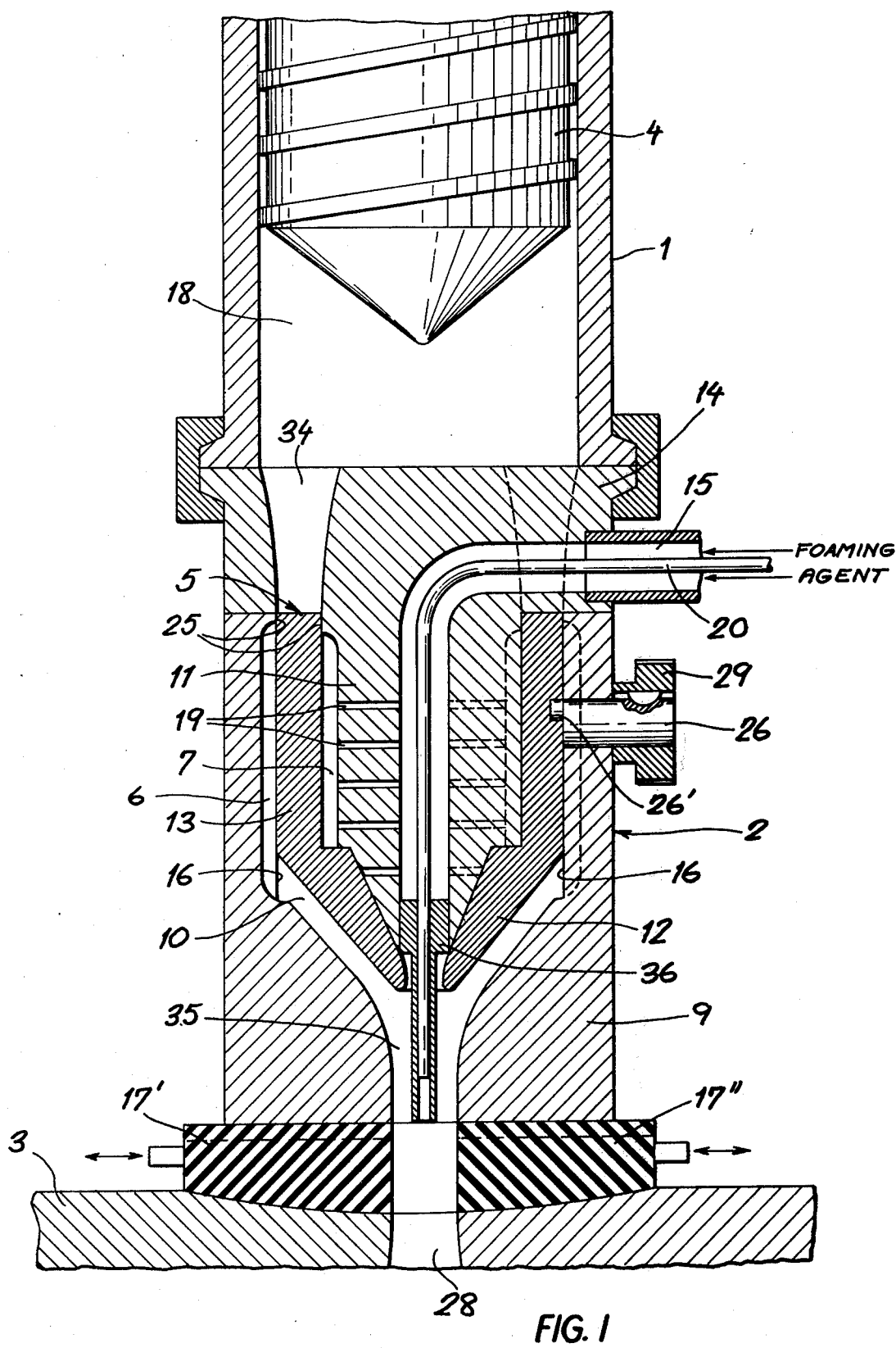
FIG. 1 is an axial sectional view of part of an injection-molding machine for practicing my invention, including a nozzle provided with a flow divider in a flow-blocking position.

In the drawing I have shown part of an otherwise conventional injection-molding machine 1 which is connected through a nozzle 2 with a mold 3 forming a cavity 30 designed to produce generally bladder-shaped articles of thermoplastic material (e.g. polystyrene) with a nonporous skin 31 and a highly porous core 32 integrally joined to each other. An injection chamber 18, provided with heating means not shown, serves for the temporary accumulation of molten thermoplastic material 33 (FIG. 2) which is injected into the cavity 30 by an axially movable compression screw 4 acting as a piston. Nozzle 2 is divided into a housing 9 and a mandrel 11 defining between them a ring space 10, the mandrel forming an annular entrance port 34 divided into segments by several transverse arms 14 (only one shown). Ring space 10 accommodates a flow divider, generally designated 5, comprising a circularly cylindrical tubular member 13 dividing that space into an outer annular clearance 6 and an inner annular clearance 7 through which the plastic material 33 may flow from chamber 18 via port 34 into a sprue 35 communicating with the restricted entrance end or gate 28 of mold 3. Clearance 6 and 7 are maintained by inner and outer ribs 16 between which the divider 5 is limitedly axially slidable. Member 13 has a frustoconical downward extension or skirt 12 which in the position of FIG. 1 comes to rest against a shoulder on the lower end of mandrel 11 to define a stop position wherein the upper edge of divider 5 blocks the outflow of plastic mass from port 31 through the coaction of walls 25 of ring space 10 with confronting surfaces of member 13. Upon an axial shifting of that member to a lower position, illustrated in FIG. 2, the material may flow into sprue 35 through clearances 6 and 7 so as to enter the cavity 30 under pressure from piston 4. It will be noted that the inner and outer walls 25 are relatively staggered so that the plastic mass flows first through the outer clearance 6 to line the cavity 30; the distribution of the mass along the cavity wall may be made more uniform with the aid of a pressure fluid as described hereinafter. Upon a further lowering of member 13, inner clearance 7 is also unblocked to let the mass enter the cavity in two concentric streams. The flow ratio of these two streams can be regulated by a suitable choice of the final operating position of member 13 whose skirt 12 differentially adjusts the cross-sections of the inner and outer flow paths.

A foaming agent can be introduced into inner stream of thermoplastic material 33, entering the cavity 30, by way of sprue 35 and gate 28, through a channel 15 passing via one of the arms 14 into the mandrel 11 in which it extends axially to a level below the bottom end of inner clearance 7, being closed at that point by a plug 36 which is traversed by a tube 20. The latter is selectively connectable, through a valve 21, to a source of fluid such as air under pressure (schematically represented by an arrow 22) and a supply of coolant (schematically represented by an arrow 23). Water or a low-temperature gas may be used as the cooling fluid. The foaming agent in channel 15 reaches the inner clearance 7 through generally radial pathways 19 which are shown as bores but which could also be represented by the interstices of mandrel 11 if the same is made, for example, of sintered metal. As indicated in the drawing, tube 20 is flexible and can be axially moved in order to extend through the gate 28 into the cavity 30 to introduce the compressed air into same.

Figure 2:
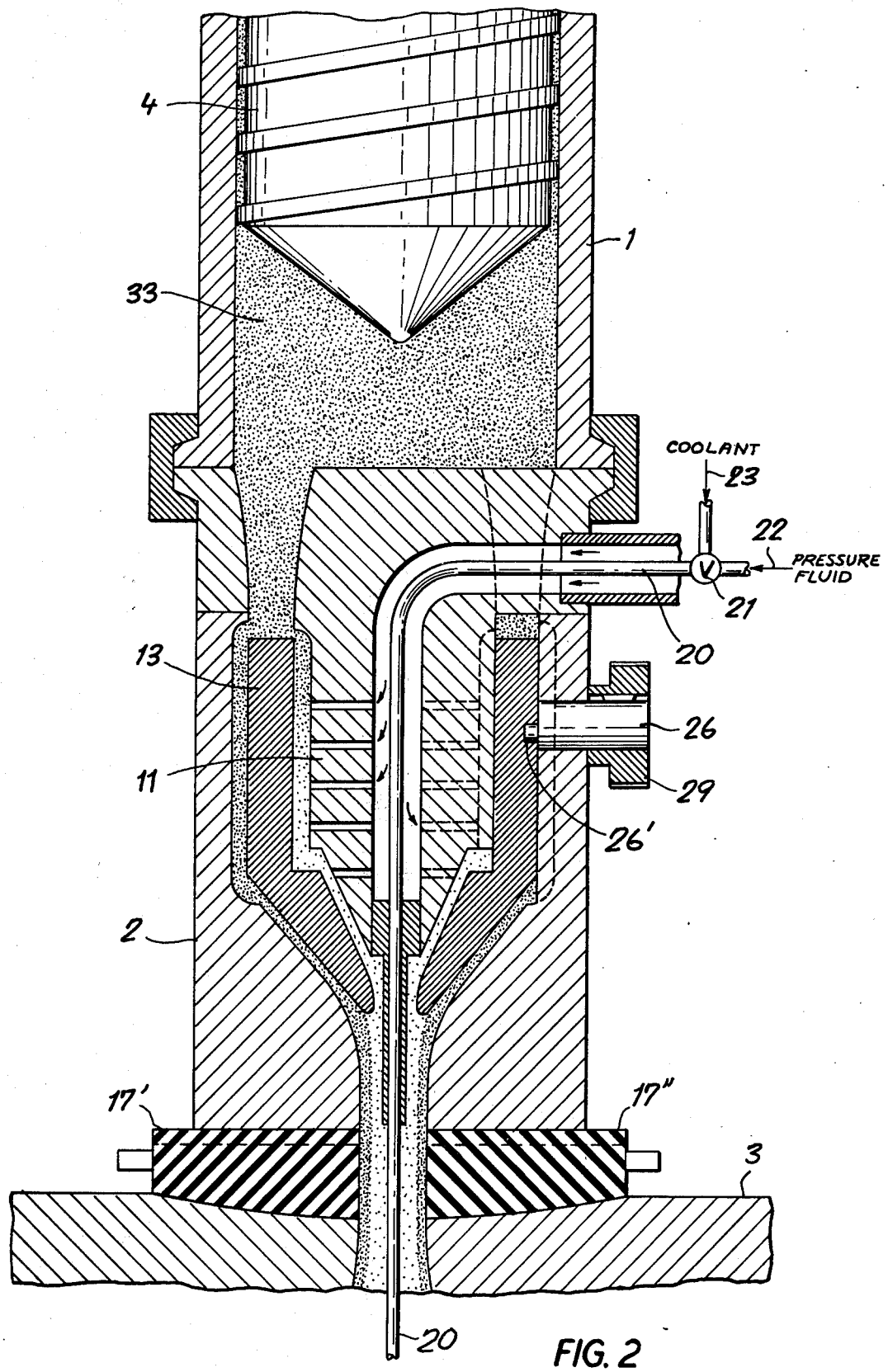
FIG. 2 is a view similar to FIG. 1, showing the flow divider in an operating position.

The shifting of flow divider 5 is accomplished, in the illustrated embodiment, with the aid of a shaft 26 lodged in nozzle housing 9, an eccentric projection 26' of this shaft entering a notch in member 13 whereby rotation of the shaft displaces that member between the closure position of FIG. 1 and a working position such as that shown in FIG. 2. Flow divider 5 may be rotatable about its vertical axis to follow the lateral excursions of projection 26' if the notch engaged by that projection is very narrow in a peripheral direction. Shaft 26 may be rotated by an operating element 29 keyed thereto, this element being either a milled knob designed for manual actuation or a gear forming part of a transmission for the automatic control of the divider position in synchronism with the operation of injection piston 4.

Figure 3:
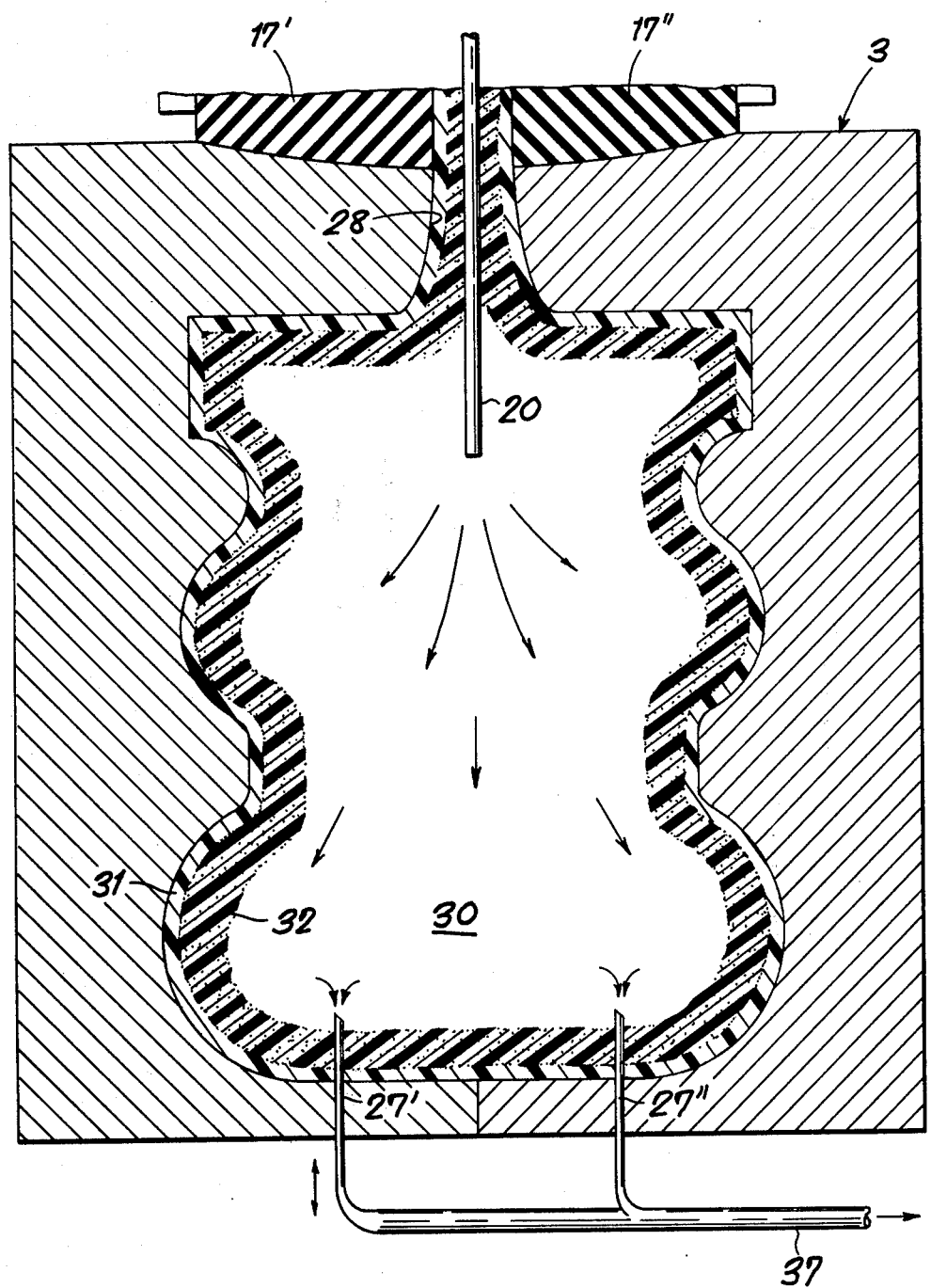
FIG. 3 is an axial sectional view of a mold cavity communicating with the nozzle of FIGS. 1 and 2.

Also shown in the drawing are a pair of shutter jaws 17', 17" which separate the nozzle 2 from the mold 3 and can be closed, upon the withdrawal of tube 20, to seal the cavity 30 temporarily during the hardening of a parison 31, 32 prior to injection of additional plastic material into the cavity for partially or completely filling the interior of that parison. As will be apparent from FIG. 2, shaft 26 can be rotated beyond the illustrated position for a further lowering of divider 5 until its skirt 12 comes to rest against the frustoconical bottom surface of nozzle housing 9, thereby closing the flow through outer clearance 6 and letting only the mixture of plastic material and foaming agent from inner clearance 7 enter the mold cavity at this stage. Shutter jaws 17' and 17", being flexible, can also be closed around the tube 20 when the latter is in its extended position as shown in FIG. 3; this allows the insertion of pressure fluid into the sealed and partly filled cavity to press the layers 31, 32 firmly against the cavity wall before the injection of additional foam plastic. In order to evacuate the pressure fluid prior to such additional injection, one or more hollow needles 27' 27" may be introduced from below into the cavity at points remote from the gate 28, these needles being connected to a conduit 37 leading to a nonillustrated suction generator. Upon withdrawl of the exhaust needles 27', 27", the still somewhat fluid plastic material in cavity 30 will coalesce to seal the openings left by these needles. The thickness of the porous inner layer 32 can thus be built up at will to any desired extent.

The mold 3, split into two separable halves, can be opened to release the formed article 31, 32.

I claim:

1. A method of making a thermoplastic article with a highly porous core surrounded by a skin of low to zero porosity, comprising the steps of:

providing a supply of substantially homogeneous flowable thermoplastic material;

directing part of said material in the form of an outer tubuler stream through a nozzle into a restricted entrance end of a mold cavity closed at its opposite end;

directing another part of said material, after initiation of the flow of said outer tubular stream, through said nozzle into said cavity as an inner tubular stream coaxially enveloped by said outer tubular stream;

continuously admixing a foaming agent with said inner tubular stream ahead of said entrance end;

admitting a fluid under pressure along the axis of said streams into said cavity, thereby building up a relatively nonporous continuous outer layer of said material on an inner cavity wall including said opposite end and a relatively porous continuous inner layer contiguously overlying said outer layer; and allowing said layers to harden in said cavity.

2. A method as defined in claim 1, comprising the further step of blocking the flow of said outer tubular stream after formation of said layers while allowing continued flow of said inner tubular stream with said foaming agent into said cavity to enlarge said inner layer.

3. A method as defined in claim 1 wherein said fluid is a compressed gas, comprising the further steps of temporarily sealing the mold cavity during partial hardening of said layers with the compressed gas inside, extracting said gas, and thereupon introducing additional thermoplastic material admixed with said foaming agent through said nozzle into the mold cavity for enlarging said inner layer.

* * * * *